United States Patent

Almasi et al.

[15] 3,679,996
[45] July 25, 1972

[54] FACE-PUMPED LASER DEVICE WITH LATERALLY POSITIONED PUMPING MEANS

[72] Inventors: Joseph C. Almasi; William S. Martin, both of Schenectady, N.Y.

[73] Assignee: General Electric Company

[22] Filed: Aug. 3, 1970

[21] Appl. No.: 60,741

Related U.S. Application Data

[63] Continuation-in-part of Ser. No. 755,654, Aug. 27, 1968, abandoned.

[52] U.S. Cl............................................331/94.5, 330/4.3
[51] Int. Cl........................................................H01s 3/00
[58] Field of Search..................................331/94.5; 330/4.3

[56] References Cited

UNITED STATES PATENTS

3,311,846   3/1967   Simpson et al.....................331/94.5

*Primary Examiner*—Ronald L. Wibert
*Assistant Examiner*—V. P. McGraw

*Attorney*—Paul A. Frank, John F. Ahern, Julis J. Zaskalicky, Louis A. Moucha, Frank L. Neuhauser, Oscar B. Waddell and Joseph B. Forman

[57] ABSTRACT

In one embodiment, a plurality of planar laser elements comprising the active laser medium are assembled into a zigzag pattern with refracting prisms forming interfaces with the major surfaces of the laser elements. A source of radiation of pumping wavelengths is positioned close to and uniformly illuminates the adjacent surfaces of the refracting prisms, the incident radiation of pumping wavelengths being refracted and reflected through the prism medium and being uniformly incident on the major surfaces of the planar laser elements, causing uniform activation therein. The coherent radiation emitted by the active laser medium radiates along an axis which extends through the interfaces but not through the uniformly illuminated surfaces adjacent the source of pumping radiation. Thus, the pumping means is laterally positioned with respect to the coherent laser beam axis. A fluid coolant having an index of refraction approximately the same as that of the laser medium or significantly different therefrom, may be utilized, flowing between the major surfaces of the laser elements and surfaces of the refracting prisms.

30 Claims, 6 Drawing Figures

INVENTORS:
JOSEPH C. ALMASI
WILLIAM S. MARTIN, by Paul A. Frank
THEIR ATTORNEY

INVENTORS:
JOSEPH C. ALMASI
WILLIAM S. MARTIN,
by Paul A. Frank
THEIR ATTORNEY

FACE-PUMPED LASER DEVICE WITH LATERALLY POSITIONED PUMPING MEANS

This application is a continuation-in-part of our copending application Ser. No. 755,654, filed Aug. 27, 1968 and now abandoned, having the same title and assigned to the same assignee.

The present invention relates to a substantially uniformly face-pumped laser device, and, more particularly, to a substantially uniformly face-pumped laser device having the pumping means positioned laterally with respect to the coherent laser beam axis.

The present invention is related to the following patents and copending applications: U.S. Pat. No. 3,423,693 to J.P. Chernoch and H.R. Koenig; U.S. Pat. No. 3,500,231 to K. Tomiyasu and J.C. Almasi; application Ser. No. 644,142 now U.S. Pat. No. 3,534,291 of J.P. Chernoch and W.S. Martin, filed June 7, 1967; application Ser. No. 755,652 of J.C. Almasi and W.S. Martin, filed Aug. 27, 1968; and the application of W.S. Martin, Ser. No. 755,653, now U.S. Pat. No. 3,581,229 filed Aug. 27, 1968, all of which are assigned to the present assignee.

It is well known in the art that laser devices emit electromagnetic radiation of wavelengths generally in the infrared and visible portions of the electromagnetic spectrum. The radiation is substantially coherent and is characterized by a narrow wavelength band.

Laser devices are operable using a suitable medium in which a population inversion may be established in a particular metastable energy level by proper "pumping." Neodymium glass, ruby, helium-neon, and carbon dioxide are media which are commonly employed. By "pumping" or irradiating the active medium with radiation possessing power necessary to create the population inversion, conditions permitting coherent emission may be obtained. The means emitting the pumping radiation causing inversion is called the "pumping means," while the wavelength of the pumping radiation is known as the "pumping wavelength."

Presently, "face-pumped" laser devices of the types discussed and claimed in the aforementioned related patents and copending applications are advantageously employed as both repetitiously pulsed and "single shot" lasers. Generally, face-pumped laser devices employ "planar laser elements" which are made of the active laser medium and have a thickness dimension along a line normal thereof which is small as compared with the transverse dimension across the faces or major surfaces thereof and, typically, is no greater than the longitudinal dimension. For purposes of illustration and ease of description herein, the words "planar laser elements" will be employed, but is not to be construed as a limiting definition since it is deemed to cover all shapes and configurations of the dimensions previously discussed. Thus, a face-pumped type of laser device permits substantially uniform activation and concomitant heating in contrast to the non-uniform optical properties of the "side-pumped, rod-type" laser device. The conventional rod type of laser device not having uniform heating and activation may suffer from beam distortion due to temperature and stress gradients across the laser aperture.

Present face-pumped laser devices require the pumping means to be on the laser beam axis, thus necessitating mirrors or prisms to act as optical separators. Usually, the mirror optical separators are reflective to the coherent radiation emitted by the active laser medium and transmissive to radiation of pumping wavelengths. For many purposes, the use of optical separators may result in a more complex optical arrangement than desired and also may preclude the addition of other desirable features. Under many circumstances, it may also be convenient to utilize the advantages of positioning the pumping means to the side of the laser beam axis while still retaining uniform face-pumping across the active laser aperture.

Therefore, it is an object of the present invention to provide for a face-pumped laser device which eliminates the need for optical separators.

It is another object of the present invention to provide for a face-pumped laser device with a pumping means positioned laterally with respect to the laser beam axis.

Briefly, in accordance with out present invention, we provide a face-pumped laser device which has a plurality of planar laser elements comprising the active laser medium assembled in a "zigzag" pattern and a plurality of refracting prism means closely positioned to and preferably in "optical contact" with the planar laser elements. The pumping means is positioned laterally with respect to the beam of coherent radiation passing through the interfaces formed by the surfaces of the laser elements and prism means. Uniform illumination, thus uniform activation, is provided over the major surfaces of each of the laser elements by the refraction and reflection of the pumping radiation incident upon and uniformly illuminating the adjacent surface of refracting prism means. In the case of the preferably "optical continuity" across the defined interfaces, the coherent laser radiation emitted by the active laser medium radiates without significant reflection or refraction and along an axis which does not extend through the uniformly illuminated surfaces of the prism means. In the case of mismatch of the prism-laser element refraction indices, the laser device is operable although the resulting reflection losses may have to be reduced by suitable means. A fluid coolant for cooling the major surfaces of the laser elements may also be provided.

The term "optical contact" as employed here and throughout the disclosure is used to describe the contact made between the surfaces of two or more media and which has the optical characteristic of permitting electromagnetic radiation (herein of ultraviolet to infrared wavelengths) to pass from one medium to a second medium with little or no reflection or refraction even at angles other than angles normal to the surface of the second medium. The terms "optical continuity" and "optically continuous" are similarly employed.

The features of our invention which we desire to protect herein are pointed out with particularity in the appended claims. The invention itself, together with further objects and advantages thereof, may be best understood with reference to the following description taken in connection with the appended drawings in which:

Figure 1:
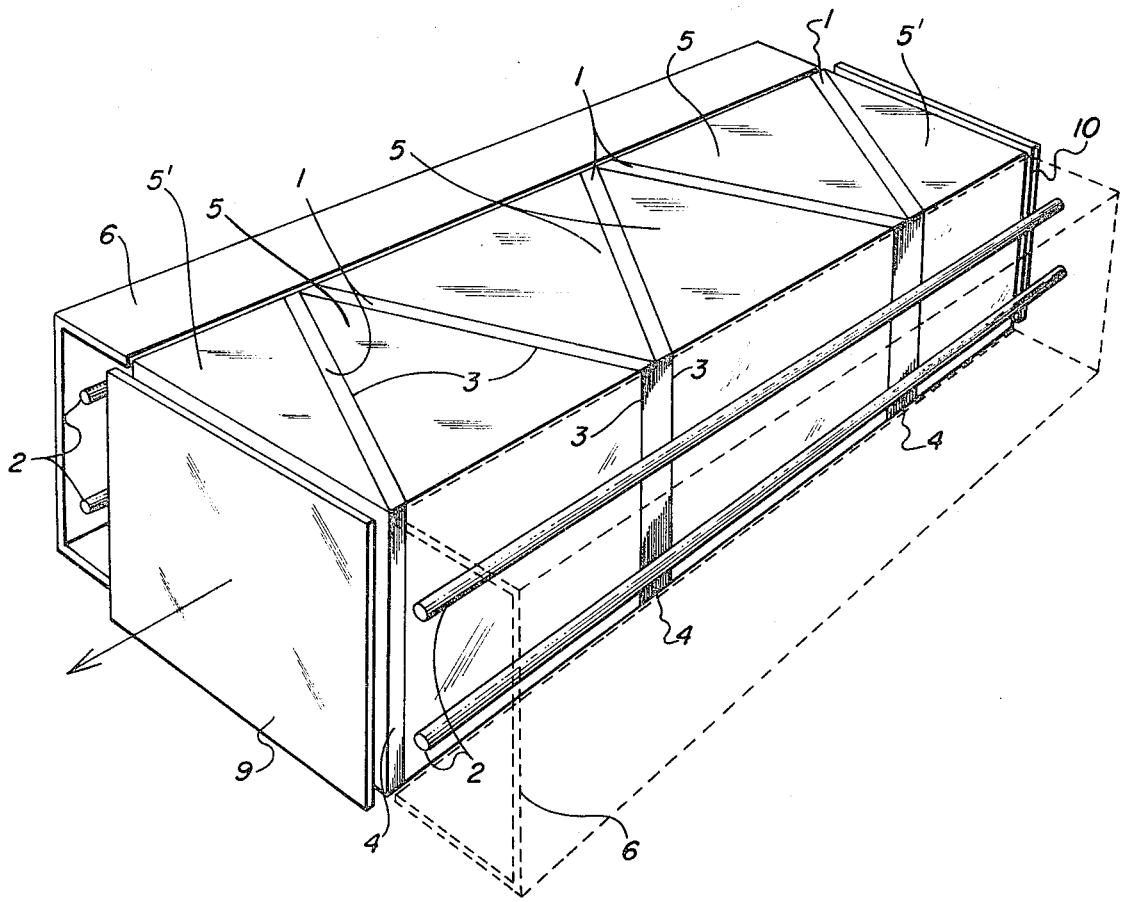
FIG. 1 illustrates in perspective one embodiment of our invention.

FIG. 1 illustrates in perspective one embodiment of our present invention which may be employed as a laser oscillator. A plurality of planar laser elements 1 are arranged in a "zigzag" pattern as is easily seen in FIG. 1 and in the top sectional view thereof depicted in FIG. 2. A zigzag pattern may be defined in the following manner. The planar laser elements 1 are arranged such that alternate laser elements 1 are substantially parallel and the adjacent laser elements 1 are angularly disposed relative to one another. It follows, therefore, that the angles formed by the adjacent laser elements 1 with one another are substantially equal.

Planar laser elements 1 are described herein as being fabricated from neodynmium doped glass, but it should be understood that other active laser media such as ruby, and neodymium doped yttrium aluminum garnet (known as YAG) may be employed as well when suitable for the desired operation. Neodymium glass is sensitive and strongly absorbing to pumping optical radiation in the range of 5000 to 9000 Angstrom units and is operative when pumped to emit radiation having a wavelength of 1.06 microns. Ruby and YAG have optical pumping radiation ranges of 3000–7000 and 5000–9000 Angstrom units, respectively, and emission radiation wavelengths of 0.69 and 1.06 microns.

Closely fitted between adjoining laser elements 1 and having surfaces preferably in optical contact with major surfaces 3 of laser elements 1 are intermediate prisms 5. Adjacent the outside major surfaces 3 of end laser elements 1 and in optical contact therewith are end prisms 5'.

Prisms 5 and 5' are selected to preferably have substantially matching refractive indices with laser elements 1 although such index matching is not essential. A liquid in the nature of glycerine or the like also preferably having a matching refractive index may be utilized to facilitate optical contact at the prisms-planar laser elements 1 interfaces although such index matching is also not essential. This index matching of the coolant to the contacted solid surface also reduces the need for polishing the surfaces to "optical smoothness," i.e., surface flatness tolerance of 1/10 wavelength at 1.06 microns. It is preferable, but not essential, that the contacting surfaces of prisms 5 and 5' have linear dimensions which approximate that of major surfaces 3.

For ease of description, prisms 5 are discussed and depicted throughout the disclosure as prisms of the right angle type. It is understood, however, that prisms having different angular dimensions may be utilized when desired for particular circumstances and that the terminology thus employed herein in reference to prism description is not meant to be limiting.

Thus, when the major surfaces 3 of laser elements 1 and the contacting surfaces of prisms 5 and 5' have approximately the same linear dimensions, the end or minor surfaces of laser elements 1 and surfaces 7 of prisms 5 and 5' together form substantially smooth and continuous surfaces. A plurality of flash lamps 2 are arranged in two banks which are respectively positioned longitudinally along and substantially parallel with the substantially smooth and continuous surfaces defined above. To prevent side pumping of laser elements 1 through the end surfaces, a reflecting mirror or shield 4 may be placed along and contiguous to the end surfaces of laser elements 1. Reflectors 6 positioned behind flash lamps 2 serve to reflect pumping radiation emitted by flash lamps 2 uniformly over surfaces 7 or prisms 5 and 5'. Reflectors 6 which may be fabricated from a material in the nature of aluminum also may be attached to the inside surface of or separate from the casing (not shown) which encloses the laser device of FIG. 1. Mirrors 9 and 10 both substantially totally reflective at pumping wavelengths define a laser cavity in which mirror 9 is partially reflecting at laser emission wavelengths. As illustrated, mirrors 9 and 10 are separated from end prisms 5', but, alternatively, may be dielectric coatings covering the end surfaces 11 and 12 of end prisms 5'. In the absence of both mirrors 9 and 10, our device becomes a single-pass laser amplifier, whereas with the use of only one mirror our device is adapted to be operative as a two-pass amplifier.

In operation, flash lamps 2 which may be of the xenon arc type produce pumping radiation which uniformly illuminates surfaces 7 of prisms 5 and 5'. When desired, a filtering jacket may be utilized to filter out unwanted infrared and ultraviolet wavelengths of light. Due to the total internal refraction and reflection occurring in prisms 5 and 5', no radiation escapes through the top or bottom surfaces thereof and all of the pumping radiation passes to the prism-laser element interfaces with the exception of small losses due to reflection of pumping radiation at surfaces 7. Because of the optical continuity across the prism-laser element interfaces due to the preferable substantial matching indices of refraction, the pumping radiation passes therethrough and is uniformly incident over the optically contacting areas of major surfaces 3 of laser elements 1. In the case of mismatch of the prism-laser element refraction indices, our device is operable as will be described hereinafter, it being recognized that such mismatch causes a departure from the desired uniform pumping irradiation over surfaces 3, and also causes reflection losses in the laser beam being transmitted through our device. The (Fresnel) reflection losses is the more serious consideration, and e.g., when our device is utilized as an amplifier if the incident (unamplified) laser beam is of high energy, the reflection losses may exceed the energy storage capabilities of the laser element and thereby undesirably cause the device to become an attenuator instead of an amplifier. The nonuniform pumping of the laser material causes nonuniform heating and concomitant stressing of the laser element which is accentuated when the laser device is operated at a high repetition rate due to the thermal conductivity of the laser material. Non-uniform heating and stressing of the laser element causes divergence and distortion of the transmitted laser beam.

Figure 3:
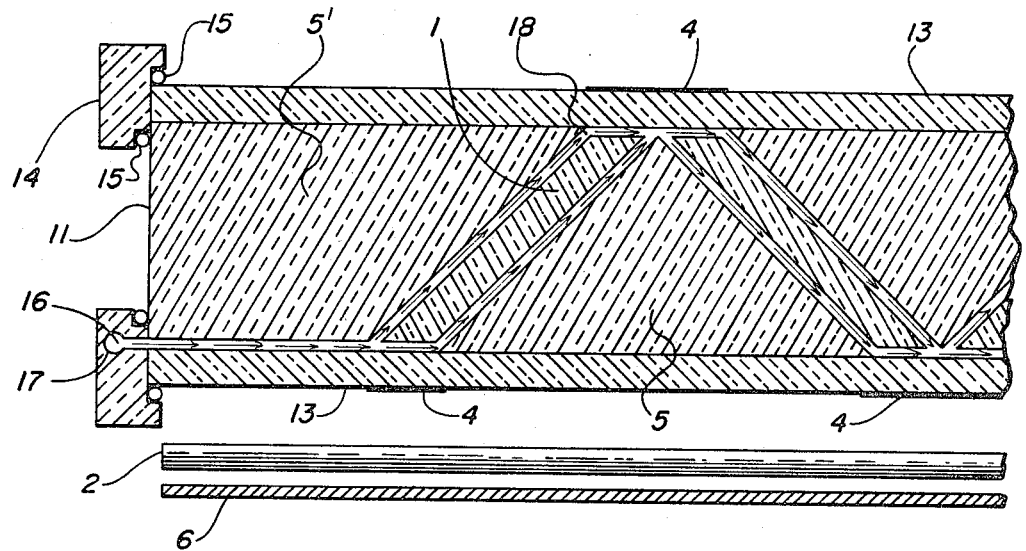
FIG. 3 illustrates a cross-sectional view of another embodiment of our present invention.

FIG. 3 illustrates another embodiment of the present invention which may be utilized as a high repetition rate, face-pumped, face-cooled laser amplifying device. A face-pumped, face-cooled laser device is described and claimed in greater detail in our aforementioned application, Ser. No. 755,652, and is incorporated by way of reference herein. Briefly, however, pyrex rectangular enclosure 13 may be employed to form a liquid-tight rectangular casing for planar laser elements 1 and prisms 5 and 5'. Reflecting shields 4 may be coatings directly on rectangular enclosure 13 directly opposite the adjoining ends of laser elements 1. Sealing rings 14 are positioned at opposite ends of tubing 13 and are secured in a liquid-tight seal with enclosure 13 and end prisms 5' by O-rings 15. A fluid coolant 16 is introduced into the laser device through coolant input chamber 17 and flows along channels 18 defined by the separations between planar laser elements 1, prisms 5 and 5', and rectangular enclosure 13. Although the flow paths for coolant 16 are depicted as a generally "series" pattern in FIG. 3, it is obvious that parallel flow paths including additional flow channels defined between enclosure 13 and all of the top and bottom surfaces of prisms 5 and 5' can be used. Spacers, not shown, may be employed to position the various laser members above in any appropriate manner.

Fluid coolant 16 performs the function of extracting heat uniformly across the laser aperture, thus keeping the thermal and related optical properties of the device uniform across the laser aperture. Because it may be important to preserve the optical continuity through the various interface regions, fluid 16 often has an index of refraction which substantially matches that of planar laser elements 1 and both prisms 5 and 5'. For example, when using neodymium glass (index of refraction 1.5) as the active laser medium, dimethyl sulfoxide, for example, (index of refraction 1.48) suffices as the coolant. However, this index matching of the fluid coolant and laser elements (and prisms) is not essential in any of our embodiments, and in some cases index-mismatching is not only tolerated, but desired to thereby obtain the advantages of particular properties of a particular laser material prism, and, or, fluid coolant. Thus, the use of high gain laser materials such as YAG precludes index matching since these materials have a considerably higher index of refraction (1.9 for YAG) than any suitable liquid coolant presently known. The above-mentioned dimethyl sulfoxide (DMSO) is a particularly desirable coolant to use with our zigzag laser since it is unique in the combination of thermal, mechanical and optical properties especially suitable for laser applications. DMSO possesses: (1) good coolant properties, (2) high photostability whereby the coolant is not degraded by repetitively pulsed pumping flashlamps, (3) low absorption at the 1.06 laser micron emission wavelength of the neodymium-glass laser whereby only a small amount of loss is introduced into the optical resonant cavity in an oscillator embodiment of our zigzag laser or into the amplification path in an amplifier embodiment, (4) is essentially transparent to pumping radiation in the range of 0.3 to 0.9 micron wavelength, and (5) has a relatively high index of refraction (1.48). This relatively high index of refraction renders DMSO an ideal coolant for commercially available neodymium doped glasses as the laser material since the indices of refraction are nearly matched. In a non-index matched case, such as using DMSO as the coolant for YAG, nonuniform pumping of the laser elements and introduction of reflection losses occurs, as stated hereinabove. However, the departure from uniform pumping is only approximately five percent, and is therefore usually negligible. The reflection losses can be reduced to an acceptable level by orienting the coolant-laser element interfaces such that the laser beam has an angle of incidence at the coolant-laser element interface approximately equal to Brewster's angle. The Brewster angle orientation requires an appropriately polarized incident laser beam, i.e., polarized in the plane of incidence. Thus, it should be understood that maximum transmission of the laser beam through our zigzag laser device is obtained by refraction index matching of the laser element, prisms and coolant, although an index mismatch between any two or all three of such materials can be tolerated in many cases, resulting in a somewhat less efficient device, but possessing selected desired properties of the particular mismatched materials.

At times it may be desirable to position the pumping source a larger distance away from the surface to be illuminated such as surfaces 7 of prisms 5 and 5'. This has the effect of more uniformly illuminating the surface, but due to lateral loss, the amount of flux incident thereon decreases. To prevent lateral loss, a "light pipe" may be placed between the surface and the pumping source. A light pipe may comprise, for example, a block of glass making optical contact with the surface. Due to total internal reflection at the sides of the light pipe, the pumping light incident upon the light pipe is refracted and reflected uniformly over the surface. In FIG. 3, the thick sides of rectangular enclosure 13 act as a light pipe. The cooling fluid maintains the optical continuity between rectangular enclosure 13 and surfaces of prisms 5 and 5'. Alternatively, a glass block of appropriate dimensions preferably, but not essentially, having substantially the same index of refraction as that of rectangular enclosure 13 and in optical contact with the sides thereof may be utilized as the light pipe. As another example of a light pipe, wall 13 on the two sides depicted in FIG. 3 can be displaced a substantial distance from prisms 5 and 5' and filled with an index matching fluid which may be the coolant (or if spacers are used, another fluid employed).

Figure 2:
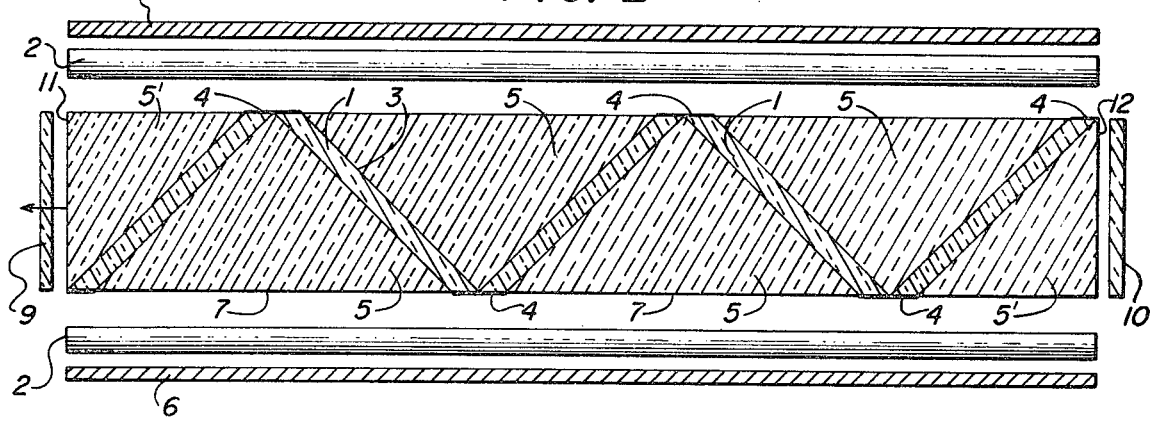
FIG. 2 is a top sectional view of the embodiment of FIG. 1.

Under other circumstances, it may be more desirable to employ an end prism 5' with a configuration other than the right angle prisms depicted in FIGS. 1 and 2. It is important, however, that the uniform illumination on surfaces 7 and, therefore, on major surfaces 3 of juxtaposed planar laser elements 1 be preserved. As stated and claimed in greater detail in the aforementioned application Ser. No. 755,653 now U.S. Pat. No. 3,581,229, in a right angle prism having a refractive index of at least $\sqrt{2}$, radiation falling incident upon one of the right angle defining surfaces, e.g., surface 7 of end prism 5' in FIG. 1, is totally refracted and reflected to the surface opposite the right angle, i.e., the right angle subtending surface. This phenomenon arises because all radiation refracted by one right angle defining surface and incident upon the other right angle defining surface equals or exceeds the critical angle thereon and is reflected toward the right angle subtending surface. When, however, another prism is added and makes optical contact with the other right angle defining surface, substantially all the radiation passes through that interface due to optical continuity. Similarly, when a prism having angles smaller than 90° is substituted for the right angle prism, total reflection again does not occur because some of the radiation refracted at one surface and incident upon the other surface does not exceed the critical angle and thus passes therethrough. In both of the above situations, the adjacent planar element 1 is not uniformly illuminated.

We have found, however, that, assuming an index of refraction of at least $\sqrt{2}$ for descriptive purposes, uniform illumination may still be obtained even though other prisms are added or prisms of different configurations are utilized. By reversing the position of a right angle end prism 5' such that one of the right angle defining surfaces is in optical contact with a laser element 1 and the right angle subtending surface is adjacent the pumping source or flash lamps 2, uniform illumination is experienced by major surface 3 of adjacent laser element 1. We have also found that any extension to the surface adjacent the pumping source, thereby increasing the 90° angle, or that any addition of optical contacting prisms to the other right angle defining surface has no effect on uniformity. It is, therefore, feasible to implement a hexahedronal end prism 5' into the laser device as depicted in FIG. 3 since it is merely an extension to the necessary configuration as delineated above.

Because materials used in prism fabrication, e.g., fused quartz, have refractive indices different than $\sqrt{2}$, the 90° angle adjacent a planar laser element 1 is only approximate, not a minimum. The minimum angle that may be utilized depends upon the refractive index of the material employed.

Figure 4:
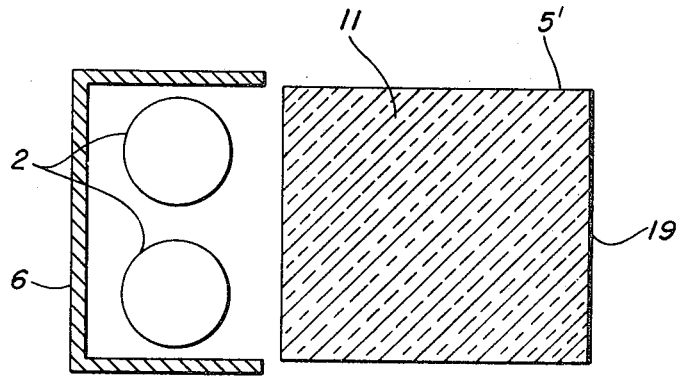
FIG. 4 illustrates an end view in section of still another embodiment of our present invention.

FIG. 4 illustrates still another embodiment of our present invention wherein a face-pumped laser device is pumped from one lateral position only. The surfaces 7 opposite pumping flash lamps 2 may be coated with a mirror coating 19 substantially totally reflective to pumping radiation. Alternately, a mirror separate from the prisms may be utilized. As is apparent from FIG. 4, the pumping radiation not absorbed upon the first pass through a planar laser elements 1 is reflected back into the active medium by reflector 19. It is readily evident from the above that pumping from a single lateral position is efficient.

Figure 5:
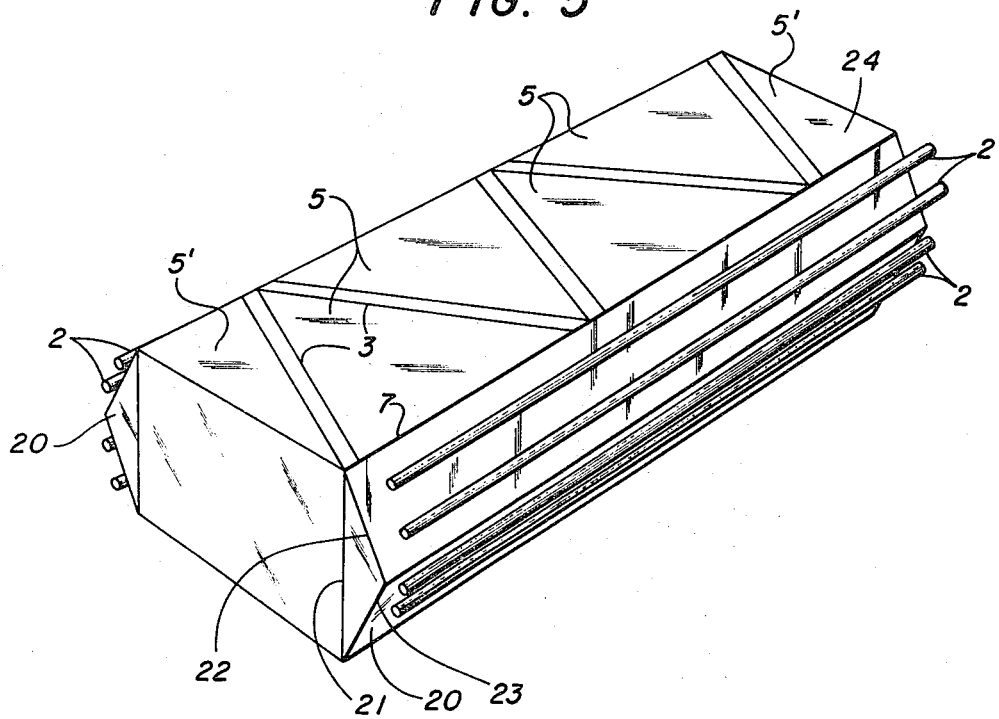
FIG. 5 illustrates in perspective an embodiment of our present invention utilized with immersion apparatus.

FIG. 5 illustrates a laterally face-pumped laser device of our present invention employing one immersion technique as described and claimed in the aforementioned application Ser. No. 755,653, now U.S. Pat. No. 3,581,229. A laser device is disclosed therein which increases the density of the pumping radiation flux upon the major surfaces of a plurality of planar laser elements. Briefly, the right angle subtending surface 21 of a right angle prism 20 having an index of refraction equal to or greater than the square root of two is placed in optical contact with the right angle subtending surfaces of prisms 5 and 5'. A plurality of flash lamps are arranged in banks approximately parallel to the right angle defining surfaces of the right angle prism. Substantially all of the pumping radiation incident upon the right angle defining surfaces due to the optical and physical characteristics of the right angle prism is refracted and totally reflected upon the optically contacted surface of the right angle subtending surfaces of prisms 5 and 5'. This increases the flux density of the pumping radiation by approximately a factor of the square root of two and, concurrently, uniformly illuminates the major surfaces 3.

As is noted by reference to FIG. 5, surfaces 7 of prisms 5 and 5' are in optical contact with surfaces 21 of right angle prisms 20 which have the physical and optical characteristics delineated above. Pumping flash lamps 2 are arranged in banks substantially parallel to the surfaces 22 and 23 of prisms 20. In operation, the density of the pumping radiation flux on surfaces 7 of prisms 5 is approximately the square root of two times as great as that on surfaces 22 and 23 of prisms 20. Because prisms 5 and 5' also uniformly illuminate the major surfaces 3 of planar laser elements 1, the density of pumping radiation flux thereon is uniformly increased. Because internal reflection at the top and bottom surfaces of prisms 5 and 5' does not apply to all the pumping radiation when employing the immersion technique above, efficiency requirements dictate the need for reflectors at these surfaces which are reflective to pumping radiation. Thus, for example, reflectors 24 substantially totally reflective to pumping radiation are depicted as mirrors on the top and bottom surfaces of prisms 5 and 5'.

Figure 6:
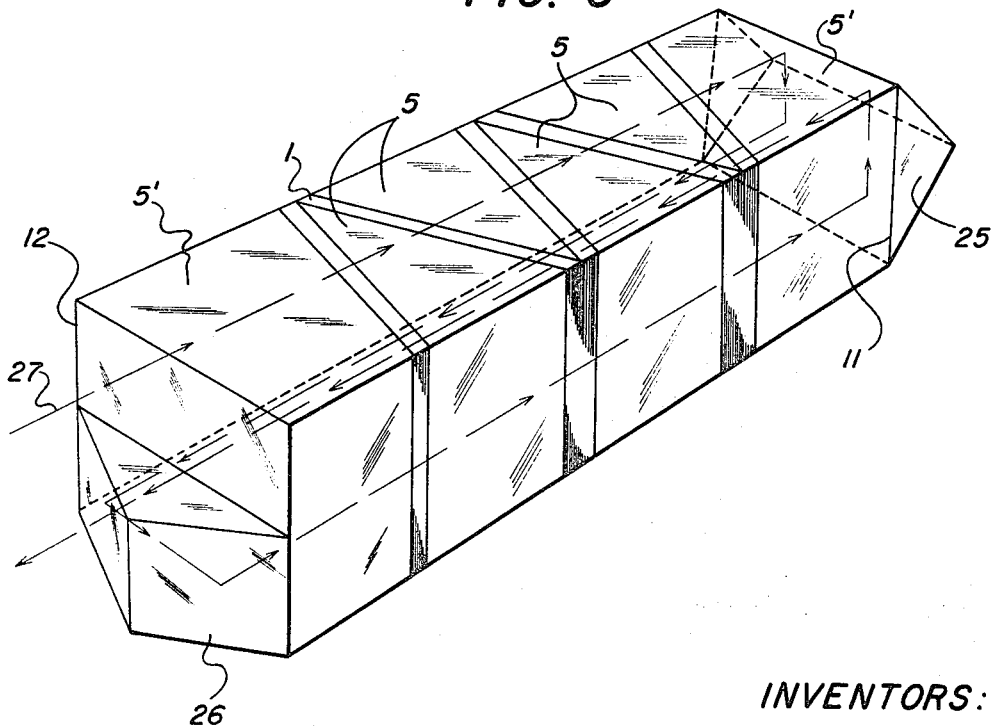
FIG. 6 illustrates in perspective an embodiment of our present invention utilized with laser beam path folding apparatus.

FIG. 6 illustrates a laser device of our resent invention utilized in conjunction with a folded path technique also described and claimed in the aforementioned application Ser. No. 755,653, now U.S. Pat. No. 3,581,229. A right angle subtending surface of a right angle prism 25 makes optical contact with and effectively covers the end surface 11 of one end prism 5'. At the opposite end, a right angle subtending surface of a second right angle prism 26, smaller in size, makes optical contact with the lower half of the end surface 12 of the other end prism 5'. The orientation of the apex of prism 26 is rotated 90° with respect to that of prism 25.

A laser beam (denoted by the dotted line 27) entering the upper left quadrant of surface 12 makes four passages through the active laser medium before exiting through the upper right quadrant of surface 12. As is evident from FIG. 6, laser beam 27 penetrates a different region of each planar laser element 1 on each passage. The penetration of different regions allows a more effective extraction of the stored energy in the active laser medium comprising laser elements 1. By increasing the number of prisms adjacent one end prism 5', the number of reflective passages may also be increased with a concurrent increase in the utilization of the stored energy.

From the foregoing, it should be readily appreciated that a face-pumped laser device utilizing all the advantageous structures disclosed herein and in the aforementioned applications is now attainable. For example, in view of the disclosure herein, the features of face-cooling, optical immersion techniques, laser beam axis folding, and laterally positioned pumping means may all be incorporated into a single face-pumped laser device. It is evident, therefore, that the device of our present invention not only retains the advantages of face-pumping, but also permits adaptation of face-pumped laser devices to a plurality of other useful features as described. Thus, by positioning the laser elements in a zigzag pattern and employing a plurality of refracting prisms which refract and reflect the pumping radiation uniformly across the apertures of each laser element, uniform face-pumping is retained while the pumping means is positioned off the axis of the coherent laser beam. The removal of the pumping means to the side allows a more compact, flexible arrangement and, concurrently, eliminates the need for optical separators.

While the invention has been set forth with respect to certain embodiments and specific examples thereof, many modifications and changes will readily occur to those skilled in the art. Accordingly, by the appended claims, we intend to cover all such modifications and changes which fall within the true spirit of the present invention.

What we claim as new and desire to secure by Letters Patent of the United States is:

1. A laser device comprising
   pumping means for emitting radiation of pumping wavelengths;
   a planar laser element comprising an active laser medium and having major surfaces with transverse dimensions larger than the distance between said major surfaces;
   refracting prisms having surfaces positioned contiguous to and forming interfaces with said major surfaces, said refracting prisms each having at least one second surface positioned adjacent said pumping means to thereby be substantially uniformly illuminated by the radiation of pumping wavelengths and refracting said radiation of pumping wavelengths substantially uniformly over said major surfaces;
   said active laser medium emitting coherent radiation in response to radiation of pumping wavelengths, said coherent radiation radiating along an axis which extends through said interfaces but not through said second surfaces.

2. The laser device of claim 1 wherein
   the active laser medium has an index of refraction approximately the same as that of said refracting prisms to thereby form optically contacting surfaces between the refracting prisms and the major surfaces of said laser element whereby the coherent radiation is emitted without significant reflection or refraction.

3. The laser device of claim 1 wherein
   the active laser medium has an index of refraction significantly different from that of said refracting prisms.

4. The laser device of claim 1 including reflecting means substantially totally reflecting to radiation of pumping wavelengths and positioned between said pumping means and end surfaces of said planar laser element to prevent radiation of pumping wavelengths from entering said end surfaces.

5. The laser device of claim 1 including a cooling fluid flowing between said major surfaces and said surfaces of said refracting prisms.

6. The laser device of claim 2 including a cooling fluid flowing between said major surfaces and said surfaces of said refracting prisms, the cooling fluid having an index of refraction approximately the same as that of said active laser medium to thereby maintain optically contacting surfaces between the refracting prisms and the major surfaces of said laser element.

7. The laser device of claim 5 wherein
   the cooling fluid has an index of refraction significantly different from that of said active laser medium.

8. The laser device of claim 5 wherein
   the cooling fluid has an index of refraction approximately the same as that of said active laser medium.

9. The laser device of claim 5 wherein
   the cooling fluid is dimethyl sulfoxide.

10. The laser device of claim 1 including a right angle prism having an index of refraction equal to at least the square root of two and positioned with the right angle subtending surface contiguous to one of said second surfaces of said refracting prisms,
    said pumping means comprising a plurality of flash lamps arranged in banks, each bank being adjacent to a different one of the right angle defining surfaces of said right angle prism.

11. The laser device of claim 1 including a plurality of right angle prisms positioned adjacent end surfaces of the two most remotely located refracting prisms for reflecting a beam of light entering an input portion of said end surfaces a plurality of times through different regions of said active laser medium before the light beam exits through an output portion in one of said end surfaces.

12. The laser device of claim 1 including a cooling fluid flowing between said major surfaces and said surfaces of said refracting prisms,
    a right angle immersing prism having an index of refraction equal to at least the square root of two and positioned with the right angle subtending surface contiguous to one of said second surfaces of said refracting prisms, wherein said pumping means comprises a plurality of flash lamps arranged in two banks, each bank being adjacent to a different one of the right angle defining surfaces of said immersing prisms; and
    a plurality of prisms positioned adjacent end surfaces of the two most remotely located refracting prisms for reflecting a beam of light entering an input portion in one of said end surfaces a plurality of times through different regions of said active laser medium before the light beam exits through an output portion in one of said end surfaces.

13. A laser device comprising
    pumping means for emitting radiation of pumping wavelengths;
    two planar laser elements comprising active laser medium and having major surfaces with transverse dimensions larger than the distance between said major surfaces, said planar laser elements being angularly disposed with respect to one another;
    refracting end prisms having surfaces positioned contiguous to the outside major surface of each planar element and forming interfaces therewith;
    a refracting intermediate prism having two surfaces positioned contiguous to the inside major surface of each planar element and forming interfaces therewith;
    each of said end and intermediate refracting prisms having at least one second surface positioned adjacent said pumping means to thereby be substantially uniformly illuminated by the radiation of pumping wavelengths and refracting said radiation of pumping wavelengths substantially uniformly over said major surfaces of said planar elements;
    said active laser medium emitting coherent radiation in response to radiation of pumping wavelengths, said coherent radiation radiating substantially along an axis which extends through said interfaces but not through said second surfaces.

14. The laser device of claim 13 wherein
the active laser medium has an index of refraction approximately the same as that of said refracting prisms to thereby form optically contacting surfaces between the refracting prisms and the major surfaces of said laser element whereby the coherent radiation is emitted without significant reflection or refraction.

15. The laser device of claim 13 wherein
the active laser medium has an index of refraction significantly different from that of said refracting prisms.

16. The laser device of claim 13 including light pipe means in optical contact with said second surfaces of said refracting prisms and positioned between said second surfaces and said pumping means, said light pipe means receiving radiation of pumping wavelengths and providing uniform illumination on said second surfaces.

17. The laser device of claim 13 including
a first reflecting means substantially totally reflecting to coherent radiation and positioned adjacent an end surface of one of said end prisms,
a second reflecting means partially reflecting to coherent radiation and positioned adjacent an end surface of the other of said end prisms, said first and second reflecting means being substantially parallel to each other and intersecting the optical axis along which coherent radiation radiates.

18. The laser device of claim 13 including a cooling fluid flowing between said major surfaces and the surfaces of said prisms contiguous thereto.

19. The laser device of claim 18 wherein
the cooling fluid has an index of refraction significantly different from that of the laser medium.

20. The laser device of claim 18 wherein
the cooling fluid has an index of refraction substantially the same as that of the active laser medium and prisms to thereby form optically contacting surfaces between the refracting prisms and the major surfaces of said laser elements whereby the coherent radiation is emitted without significant reflection losses.

21. The laser device of claim 13 including two right angle prisms having an index of refraction equal to at least the square root of two and positioned with the right angle subtending surfaces contiguous to the second surfaces of the end and intermediate prisms, said pumping means being a plurality of flash lamps arranged in banks, each bank being adjacent to a different one of the right angle defining surfaces of said right angle prisms.

22. The laser device of claim 13 including a plurality of prisms positioned adjacent end surfaces of said end prisms for reflecting a beam of light entering an input portion in one of said end surfaces a plurality of times through different regions of said active laser medium before the light beam exits through an output portion in one of said end surfaces.

23. The laser device of claim 13 including a cooling fluid having an index of refraction approximately the same as that of said active laser medium, said cooling fluid flowing between said major surfaces and said optically contacting surfaces of said end and intermediate refracting prisms and maintaining said laser elements and said prisms in optical contact;
right angle immersing prisms having an index of refraction equal to at least the square root two and positioned with the right angle subtending surfaces contiguous to said second surfaces of said end and intermediate refracting prisms, wherein said pumping means comprises a plurality of flash lamps arranged in banks, each bank being adjacent to a different one of the right angle immersing prisms; and
a plurality of prisms positioned adjacent end surfaces of said refracting end prisms for reflecting a beam of light entering an input portion in one of said end surfaces a plurality of times through different regions of said active laser medium before the light beam exits through an output portion in one of said end surfaces.

24. A laser device comprising
pumping means for emitting radiation of pumping wavelengths,
a plurality of planar laser elements comprising an active laser medium and each having major surfaces with transverse dimensions larger than the distance between major surfaces, said plurality of planar laser elements arranged in a pattern such that alternate planar laser elements are substantially parallel and adjacent planar laser elements are angularly disposed relative to each other with the angles therebetween being substantially equal;
refracting end prisms having surfaces positioned contiguous to the outside major surfaces of each end planar laser element and forming interfaces therewith;
refracting intermediate prisms positioned substantially between adjacent planar laser elements, said intermediate prisms having first surfaces contiguous to the inside major surfaces of adjacent planar laser elements and forming interfaces therewith;
each of said end and intermediate refracting prisms having at least one second surface positioned adjacent said pumping means to thereby be substantially uniformly illuminated by the radiation of pumping wavelengths and refracting said radiation of pumping wavelengths substantially uniformly over said major surfaces of said planar laser elements;
said active laser medium emitting coherent radiation in response to radiation of pumping wavelengths which radiates substantially along an axis which extends through said interfaces but not through said second surfaces of said end and intermediate refracting prisms.

25. The device of claim 24 wherein
the active laser medium has an index of refraction approximately the same as that of said refracting prisms to thereby form optically contacting surfaces between the refracting prisms and the major surfaces of said laser elements whereby the coherent radiation is emitted without significant reflection or refraction,
said pumping means is a bank of flash lamps positioned adjacent to said second surfaces of said end and intermediate refracting prisms which are located on one side of the pattern defined by the planar laser elements,
reflecting means substantially totally reflecting to radiation of pumping wavelengths positioned contiguous to said second surfaces of said end and intermediate refracting prisms which are located on the other side of the pattern defined by the planar laser elements.

26. The device of claim 24 including a cooling fluid having an index of refraction approximately the same as that of said active laser medium, said cooling fluid flowing between said major surfaces and said surfaces of said end and intermediate refracting prisms and maintaining said laser elements and said prisms in optical contact.

27. The device of claim 24 including a cooling fluid having an index of refraction significantly different from that of said active laser medium, said cooling fluid flowing between said major surfaces and said surfaces of said end and intermediate refracting prisms.

28. The laser device of claim 24 including right angle prisms having an index of refraction equal to at least the square root of two and positioned with the right angle subtending surfaces contiguous to said second surfaces,
said pumping means comprising a plurality of flash lamps arranged in banks, each bank being adjacent to a different one of the right angle defining surfaces of said right angle prisms.

29. The laser device of claim 24 including a plurality of prisms positioned adjacent end surfaces of said refracting end prisms for reflecting a beam of light entering an input portion in one of said end surfaces a plurality of times through different regions of said active laser medium before the light beam exits through an output portion in one of said end surfaces.

30. The laser device of claim 24 including a cooling fluid having an index of refraction approximately the same as that of said coherent radiation emitting material, said cooling fluid flowing between said major surfaces and said surfaces of said end and intermediate prisms and maintaining said laser elements and said prisms in optical contact;

right angle prisms having an index of refraction of at least the square root of two and positioned with the right angle subtending surfaces contiguous to said second surfaces, said pumping means comprising a plurality of flash lamps arranged in banks, each band being adjacent to a different one of the right angle defining surfaces of said right angle prisms; and a plurality of prisms positioned adjacent end surfaces of said end refracting prisms for reflecting a beam of light entering an input portion in one of said end surfaces a plurality of times through different regions of said active laser medium before the light beam exits through an output portion in one of said end surfaces.

* * * * *